Patented June 29, 1937

2,085,527

UNITED STATES PATENT OFFICE 2,085,527

PROCESS FOR TREATING MINERAL OILS

Spafford Munroe Gregory, Long Beach, Calif., assignor to Shell Development Company, San Francisco, Calif., a corporation of Delaware No Drawing. Application April 19, 1935,
Serial No. 17,259

6 Claims. (Cl. 196—42)

This invention pertains to the oxidizing treatment of organic liquids containing oxidizable components and is more specifically concerned with a new process for sweetening of acid treated petroleum distillates.

It is customary in producing salable hydrocarbon products, particularly those derived from petroleum, to refine raw mixtures, such as straight run or cracked or synthetic distillates, by means of sulfuric or other active acid, such as hydrochloric or other mineral acid, and to follow this refining by a neutralizing treatment with an alkali. Many hydrocarbon products manufactured in this manner require additional refining for removing or oxidizing remaining impurities. For example, it is often necessary to eliminate obnoxious components, such as certain mercaptans which are readily detected by the well known doctor test; a treatment with doctor solution is very common for this purpose. Moreover, many hydrocarbon products require additional refining to eliminate gum forming impurities; a mild oxidizing treatment has been found to be effective to reduce the quantity of gum formed by these substances. Such an oxidation treatment may consist of blowing a carefully controlled amount of oxygen thru the distillate in the presence of cupric chloride.

My invention provides a process which combines in one operation the neutralization of acid treated distillates and the oxidation of certain oxidizable compounds contained in the distillate and uses only one chemical reagent, namely a metallic oxide, such as commercial manganese dioxide or the ore containing this oxide. It is an object of my invention to simplify the process now in use, which includes the handling of two solids, litharge and sulfur, and three liquids, doctor solution, caustic soda solution, and water.

Another object of my invention is to eliminate completely the doctor treater, and therefore, the gasoline losses attributable to doctor treatment. Moreover, there will be no possibility of excess free sulfur being found in the finished gasoline, which should have a beneficial effect on color and color stability.

It is also an object of my invention to eliminate the pressure distillate emulsions and the pressure distillate wash waters as a part of the refinery effluent.

While my process may be successfully applied in different ways, such as, for instance, bringing the unneutralized acid treated oil into intimate contact with a slurry of a finely divided suitable metal oxide, such as pyrolusite, I shall briefly describe here a preferred way of carrying it out.

A hydrocarbon mixture, such as a pressure distillate, is brought in contact with a strong acid of the type of sulfuric acid, and the resulting mixture is allowed to separate into sludge acid and hydrocarbon layers, the latter retaining substantial amounts of strongly acidic reaction products and/or some of the unconsumed acid used in the treatment. The hydrocarbon material, after having been washed with water, if desired, is reacted with a metal oxide of the type of $MnO_2$. Instead of manganese dioxide I may use any other metal oxide which under the conditions of the process will liberate an oxidizing reagent when reacted upon by a strong acid. Such oxides contain oxygen in excess of the amount which is equivalent to the normal valence of the metal in the presence of strong acids, one oxygen atom being equivalent to two metal linkages. Suitable acids are sulfuric, sulfonic, hydrochloric, or other similar strong acids. Among the active metal oxides are chromium di- or tri-oxides, vanadium pentoxide, molybdenum trioxide, ferric oxide, barium peroxide, lead peroxide, zinc peroxide, titanium dioxide. Although I may use any metal oxide of this type, I have found that $MnO_2$ is very effective and may be used in preference to others. A metal oxide of the type of $MnO_2$ reacts with the distillate to neutralize its mineral acidity, i. e. the sulfuric, sulfonic, hydrochloric, or other organo-mineral acids remaining in it after a suitable acid treatment. At the same time, the oxygen or other active oxidizing reagent liberated by the reaction of the metal oxide with the acids converts the mercaptans and/or other oxidizable substances present in the oil into disulfides and/or other oxidation products, thus simultaneously neutralizing and sweetening and/or refining the distillate.

The active oxidizing reagents most frequently liberated by various combinations of metal oxides and strong acids, are oxygen, hydrogen peroxide and chlorine, as well as bromine and oxides of halogen, of which oxygen is the most common.

It has been found that the success of the operation is largely dependent on the relationship between the residual mineral acidity of the acid treated distillate and its mercaptan sourness or its content of other impurities which are to be oxidized as the result of the reaction between $MnO_2$ and the acids. One method of regulating the residual mineral acidity consists of varying the quantity of acid sludge which is separated from the acid treated distillate. Such a distillate may be introduced into a settling tank and a part of the sludge separated from it. The separation of the sludge may be regulated by the use of various flocculating agents or adsorbents, washing with water, etc., or a quantity of the acidic distillate is substantially freed from the suspended acid by such methods as centrifuging, filtering thru a bed of solids, etc., and is subsequently blended with another quantity of the acid-sludge-containing distillate. The two quantities are so proportioned as to result in a blend of a predetermined content of strong acids. In order to lower the concentration of acid sludge in an acid treated distillate, the acid-sludge-containing distillate may be mixed with a distillate substantially free of mineral acidity.

If an acid treated oil has a low value of mercaptan sourness, a correspondingly low degree of the residual mineral acidity may be sufficient to evolve enough oxidizing reagent for sweetening, and a higher mineral acidity will lead only to an increased consumption and unnecessary waste of manganese dioxide or other metal oxide used. If the mercaptan sourness of the oil is high, a proportionally higher residual mineral acidity will be required, or the product, though neutralized by the process, will not be sweetened for want of oxygen, and will give a sour reaction to the doctor test.

During extensive tests made with California pressure distillates, samples of the acid treated stock with a varying mineral acidity of from 700 to 3,000 parts per million were subjected to the manganese dioxide treatment. The products proved sour to the doctor test in all cases where the acidity of the stock was less than 1,200 parts per million, and sweet where it was greater than that. This demonstrated that for the given grade of the pressure distillate, the critical acidity was 1200 P. P. M. In general it has been found that for sweetening sour organic solutions it is necessary to leave therein sufficient effective acidity to produce by reaction with an excess of metal oxide such a quantity of active oxidizing reagent which is at least equivalent to the amount of sour mercaptans present in the solution undergoing treatment.

In a practical application of the process a continuous stream of the acidic oil may be passed thru a filter-like bed of metal oxide, which may consist of a substantially pure metal oxide or metal oxide mixed with a filter aid. By this method, the oil may be treated with an active metal oxide until the latter is exhausted. In another method of operation a finely divided metal oxide may be agitated with a quantity of acidic oil. Usually an excess of metal oxide is used, so that not only enough oxidizing reagent is liberated to sweeten or otherwise oxidize the oil, but also all of the strong acid or sludge is neutralized. The time of contact is regulated to allow one or both reactions to proceed to completion. It is evident that this process provides means for sweetening sour oils containing strong acids without necessarily effecting complete neutralization of the acidic oil. If the residual acidity is too low, a quantity of acid may be added to the distillate to permit the desired oxidation reaction.

Oxidation catalysts such as vanadium oxide, molybdenum oxide, platinum, etc., may be present in the reacting mixture and can be used to modify the oxidation reaction.

Recovery of the exhausted metal oxide may be carried out by conventional methods, and processes for this purpose depend upon the nature of the particular metal oxide. In many cases it is possible to remove the acid radicle which has been absorbed during the oxidation process, by means of an alkali wash, and to restore the original oxide by blowing with air. Passing the air, or other oxygen-containing gas thru the acidic liquid while the latter is in contact with an active metal oxide generally increases the efficiency of the treatment and prolongs the life of the active metal oxide, possibly by virtue of its partial recovery in situ. Hydrogen sulfide should be removed from the distillate at some point of the process prior to the oxidizing treatment, for mild oxidation converts hydrogen sulfide to free sulfur, which may become the cause of corrosiveness and instability of the treated distillate. Removal of hydrogen sulfide is most conveniently achieved by means of a caustic or lime wash preceding the acid treatment.

As was stated above, the elimination of large amounts of emulsions is one of the advantages of the process. The sludge which usually forms in the refining zone may be either continuously withdrawn, if it forms a liquid of low enough viscosity, or else be removed by washing. To prevent losses of the reagent from the filter bed, it preferably should be held in place with suitable supporting means.

The pressure distillates neutralized and sweetened by my process may or may not be subjected to further distillation. It should be noted, however, that if the overhead product is to remain sweet to the doctor test after the distillation, relatively low temperatures must be maintained, for the pyrolusite treated pressure distillate, as well as any other sweetened pressure distillate, usually yields a sour gasoline if the skin and kettle temperatures obtained during the distillation are so high that disulfides begin to decompose into mercaptans. Experiments have shown that this critical temperature is about 275° F.; therefore, a steam distillation or a distillation under vacuum may be desirable in order not to exceed it.

While in the foregoing description the use of my invention was disclosed in connection with sweetening a hydrocarbon distillate, it is understood that the process is applicable for effecting oxidation of any relatively readily oxidizable organic or inorganic substance, and particularly oxidizable impurities present in organic substances, such as synthetic alcohols, ketones, organic acids, coal tar products, etc. Pure mercaptans and similar oxidizable organic substances can be converted into their oxidation products by the method of this invention; also inorganic solutions of salts and the like, such as for instance solutions of ammonium sulfate produced at gas works, can either be purified or oxidized.

I claim as my invention:

1. In the process of sweetening a sour distillate containing mercaptans in the proportion of a California cracked pressure distillate, the steps of contacting said distillate with a quantity of sulfuric acid to effect a partial refining, to form a sludge and to impart to the distillate an acidity in excess of 1200 parts per million, separating a portion of the sludge to reduce the acidity to not below about 1200 parts per million, and bringing the resulting acid reacting distillate in contact with at least an amount of metal oxide sufficient substantially to neutralize the acid, said metal oxide containing oxygen in excess of the amount which is equivalent to the normal valency of the metal and being capable of liberating active oxygen in contact with sulfuric acid.

2. The process of claim 1 wherein the metal oxide is $MnO_2$.

3. In the process of treating a hydrocarbon liquid containing undesirable components convertible to less undesirable compounds by oxidation, the steps of refining said liquid with a quantity of a sludge-forming acid of the type of sulfuric acid, capable under the conditions of the subsequent treatment of liberating active oxygen from a metal oxide containing oxygen in excess of the amount which is equivalent to the normal valency of the metal in the presence of said acid, the acid being of the character and in quantity to effect a partial refining of the liquid and to produce acid sludge in excess of a critical amount necessary for the oxidation of said components, separating the excess sludge from the treated liquid and then bringing the liquid together with the residual sludge into contact with the metal oxide at least in the amount necessary to neutralize the acidity of the liquid.

4. The process of claim 3 in which the treated liquid and the metal oxide are contacted in the presence of an oxidizing catalyst.

5. The process of claim 3 in which the treated liquid and the metal oxide are contacted in the presence of air.

6. In the continuous process of treating a hydrocarbon liquid containing undesirable components convertible to less undesirable compounds by oxidation, the steps of refining said liquid with a quantity of a sludge-forming acid of the type of sulfuric acid, capable under the conditions of the subsequent treatment of liberating active oxygen from a metal oxide containing oxygen in excess of the amount which is equivalent to the normal valency of the metal in the presence of said acid, the acid being of the character and in quantity to effect a partial refining of the liquid and to produce acid sludge in excess of a critical amount necessary for the oxidation of said components, dividing the liquid together with the sludge into two portions, removing said excess sludge from one portion, combining the desludged portion with at least an amount of the other portion necessary to form a partly desludged liquid of a sludge content substantially equal to and not less than the critical amount and then bringing the combined liquid together with the residual sludge into contact with a quantity of the metal oxide sufficient to neutralize the acidity of the liquid.

SPAFFORD MUNROE GREGORY.